United States Patent [19]

Mydels

[11] 4,047,823

[45] Sept. 13, 1977

[54] CLAMPING ARRANGEMENT FOR A FLEXIBLE EARTH-WORKING TINE

[75] Inventor: John W. Mydels, LaPorte, Ind.

[73] Assignee: Allis-Chalmers Corporation, Milwaukee, Wis.

[21] Appl. No.: 721,104

[22] Filed: Sept. 7, 1976

[51] Int. Cl.² .................. F16B 7/04; A01B 15/00
[52] U.S. Cl. .................. 403/188; 172/708; 172/762; 403/386
[58] Field of Search ............... 403/188, 190, 191, 187, 403/384, 386, 388, 13, 14, 318, 22, 291, 405; 172/643, 646, 707, 708, 142

[56] References Cited

U.S. PATENT DOCUMENTS

| | | | |
|---|---|---|---|
| 2,490,237 | 12/1949 | Silver | 403/188 |
| 2,873,149 | 2/1959 | Redetzke | 403/22 |
| 3,123,154 | 3/1964 | Boyle | 172/707 X |
| 3,756,327 | 9/1973 | Orthman | 403/389 X |
| 3,896,883 | 7/1975 | Howes | 172/707 X |
| 3,921,726 | 11/1975 | Connor | 172/707 X |

FOREIGN PATENT DOCUMENTS 566,959  12/1958  Canada ................ 172/707

Primary Examiner—Wayne L. Shedd
Attorney, Agent, or Firm—Charles L. Schwab

[57] ABSTRACT

A flexible earth-working tine is releasably fastened to a transverse tool bar by use of a pair of identical clamping parts, a keeper element and releasable fastening means. The clamping parts are disposed on vertically opposite sides of the tool bar and have corresponding front ends with aligned vertical openings to receive a bolt extending downwardly therethrough, the bolt also connecting with the mounting end of the flexible tine. Corresponding rear ends of the clamping parts are maintained in assembled relationship by a keeper element and the flexible tine extends from its mounting end in encircling relation to the tool bar with an upwardly extending portion passing between transversely spaced fingers extending rearwardly from the upper and lower clamping parts. The upwardly extending portion of the earth-working tine disposed between the fingers serves to maintain the keeper element in its operative position on the fingers. The rearwardly extending fingers of the clamping parts prevent transverse movement of the tine and a single fastening bolt, with its cooperating nut, maintains the earth-workig tine and clamping parts in rigid clamped relation on the tool bar.

14 Claims, 3 Drawing Figures

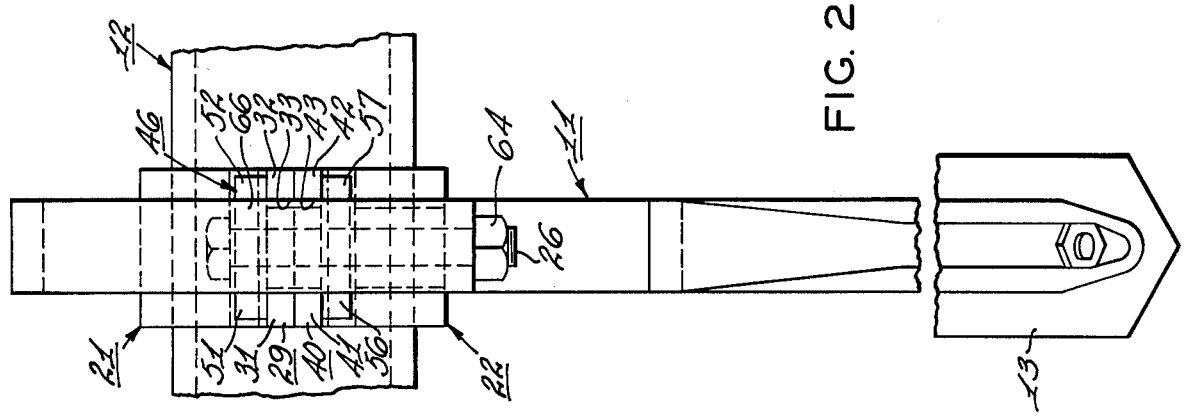
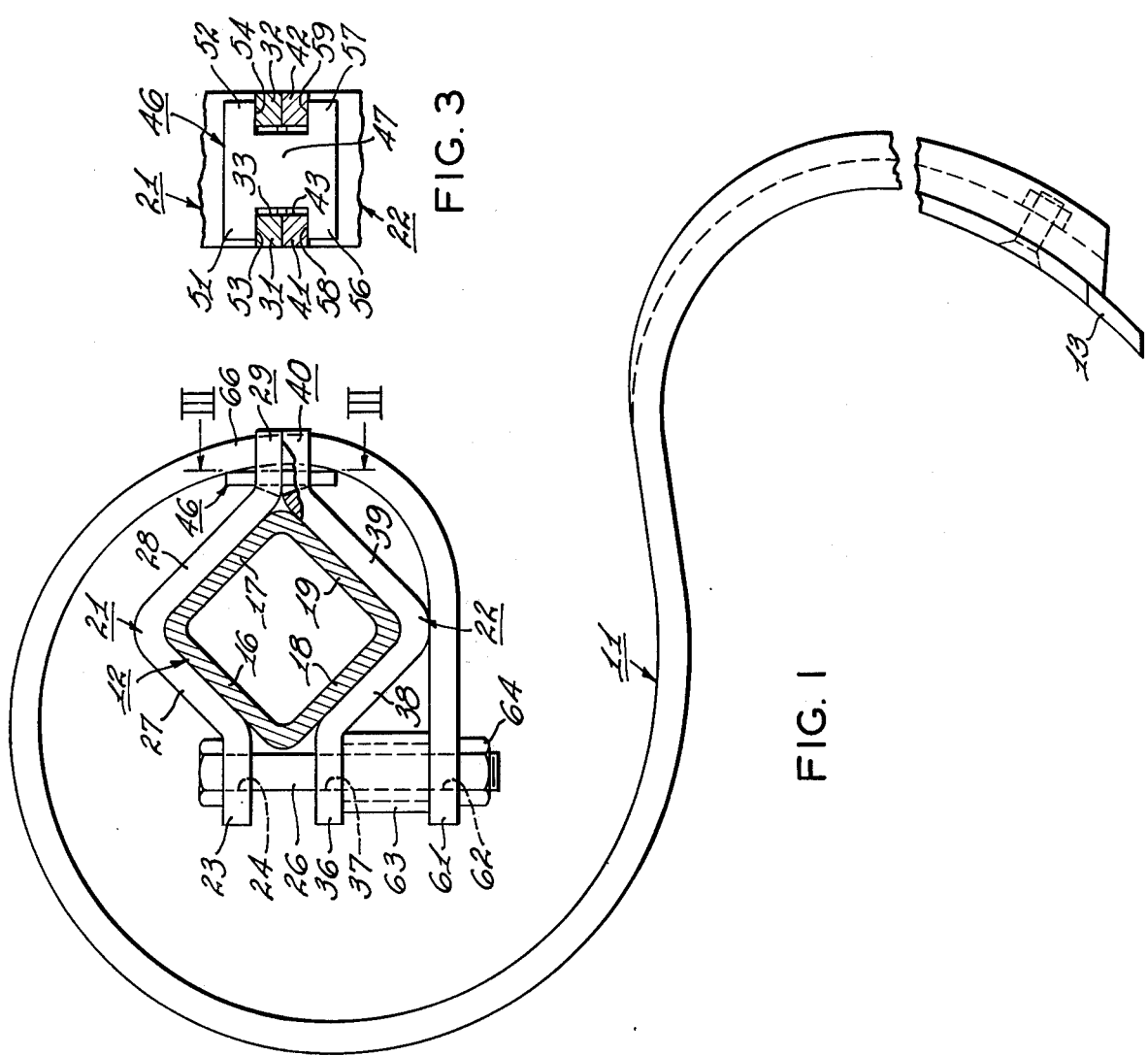
FIG. 2
FIG. 3
FIG. 1

CLAMPING ARRANGEMENT FOR A FLEXIBLE EARTH-WORKING TINE

BACKGROUND OF THE INVENTION

Heretofore, various clamping arrangements have been suggested for tools and particularly for flexible earth-working tines. A desirable clamping arrangement for a flexible tine prevents the tine from rotating relative to the tool bar and from shifting laterally thereto. The clamping arrangement should be such as to not create points of high stress in the tine itself. U.S. Pats. Nos. 3,921,726; 3,896,883 and 3,618,675 show a clamping arrangement for a flexible tine wherein a bolt, a nut and a single clamping part secure the tine to a transverse tool bar. U.S. Pat. No. 2,873,149 shows a pair of identical clamping parts for securing a tool shank to a square section transverse tool bar, the clamping parts and tool shank being held on the tool bar by use of keepers interconnecting corresponding ends of the clamping members and a bolt and a nut interconnecting the other ends of the clamping members.

BRIEF DESCRIPTION OF THE PRESENT INVENTION

In the clamping arrangement of the present invention, which is particularly useful in clamping a flexible earth-working tine to a tool bar, a pair of upper and lower clamping parts have rearwardly extending ends over which a keeper element is slipped during assembly. As illustrated, the rear ends of the clamping parts have fingers defining notches and the keeper element is I-shaped with a reduced width intermediate portion disposed within the notches to thus maintain the notched ends of the clamping parts in assembly. The forward ends of the clamping parts and the mounting end of the flexible earth-working tine are fastened together on the tool bar by a single bolt and a single nut. The earth-working tine extends rearwardly beneath the lower clamping part and thence upwardly through the notched rear ends of the clamping parts and thence in an encircling arc around the tool bar and clamping parts. The portion of the earth-working tine passing between the fingers serves to maintain the keeper element on the rear ends of the clamping parts and the fingers prevent transverse displacement of the tine.

BRIEF DESCRIPTION OF THE DRAWINGS

The present invention is illustrated in a single sheet of drawings wherein:

FIG. 1 shows a side view of an earth-working tine releasably secured to a transverse tool bar by the clamping arrangement of the present invention;

FIG. 2 is a rear end view of the parts shown in FIG. 1; and

FIG. 3 is a section view taken along the line III—III in FIG. 1.

DETAILED DESCRIPTION OF THE INVENTION

Referring to the drawings, a flexible earth-working tine 11 of generally S-shaped configuration is shown releasably secured to a transverse, quadrangular section tool bar 12 by a clamping arrangement incorporating the present invention. The lower earth-engaging end of the tine 11 carries a replaceable tooth 13 and the upper end of the tine is designed to encircle the tool bar 12. The tool bar 12 to which the upper end of the earth-working tine 11 is releasably secured is a rectangular or square section tube and is oriented so as to have a first pair of sloping side walls 16, 17 which are upwardly converging and a second pair of sloping side walls 18, 19 which are downwardly converging. The clamping arrangement of the present invention includes identical upper and lower clamping parts 21, 22 above and below the tool bar 12. The upper clamping part 21 has a first segment 23 at its front end which presents a vertical opening 24 for receiving a bolt or bolt component 26 of a releasable fastening means. The upper clamping part 21 also includes a second segment 27 which extends upwardly and rearwardly from the first segment 23 adjacent to the side wall 16 of the tool bar 12, and a third segment 28 which extends downwardly and rearwardly from the second segment 27 adjacent to the side wall 17 of the tool bar 12. The upper clamping part also includes a rear segment 29 which includes a pair of transversely spaced, rearwardly extending fingers 31, 32 which define a rearwardly opening notch 33 therebetween. The lower clamping part 22 includes a first portion 36 at its front end presenting a vertical opening 37 in alignment with opening 24 of clamping part 21 for receiving the bolt component 26. The lower clamping part 22 also includes a second portion 38 extending rearwardly and downwardly from the first portion 36 and a third portion 39 extending upwardly and rearwardly from the second portion 38. The portions 27, 28, 38, and 39 are in thrust transmitting engagement with the walls 16, 17, 18, 19, respectively, of the tool bar 12. The lower clamping part 22 also includes a rear portion 40 having a pair of transversely spaced fingers 41, 42 defining a rearwardly opening notch 43 therebetween which is in vertical alignment with notch 33 on the upper clamping part 21.

An I-shaped keeper element 46 serves to maintain the rear ends 29, 40 of the clamping parts 21, 22 in assembled condition. The keeper of keeper element 46 includes a first pair of arms 51, 52, which extend in transversely opposite directions from a reduced width, vertically extending portion 47 so as to present downwardly facing thrust transmitting surfaces 53, 54 in thrust transmitting relation to the upper side of the fingers 31, 32. A second pair of arms 56, 57 extend in transversely opposite directions from the lower end of the vertically extending portion 47 so as to present upwardly facing thrust transmitting surfaces 58, 59 in thrust transmitting engagement with the underside of the fingers 41, 42. The upper or mounting end 61 of the tine 11 includes a vertical opening 62 in alignment with openings 24, 37 of clamping parts 21, 22. The mounting end 61 is spaced from the lower clamping part 22 by a cylindrical spacer or sleeve 63 through which the bolt 26 passes. A nut 64 is threaded onto the threaded end of the bolt 26 thereby providing fastening means for releasably yet rigidly securing the front ends of the clamping parts 21, 22 and the end 61 of the tine together and to the tool bar 12. The upper end of the tine 11 extends rearwardly from the mounting end 61 thence upwardly to present an upwardly extending portion 66 which is disposed in the notches 33, 43 between the fingers 31, 32, 41, 42. The fingers 31, 32, 41, 42 serve as abutments to prevent lateral or transverse shifting of the portion 66 of the tine 11 and the portion 66 of the tine 11 keeps the keeper element 46 in assembly with the rear ends 29, 40 of the clamping parts 21, 22. The tine 11 extends in an encircling manner from the upwardly extending portion 66 upwardly and forwardly above clamping part 21, thence downwardly in front of the clamping parts 21, 22.

The clamping arrangement is installed on the tool bar by first placing the identical clamping parts 21, 22 above and below the tool bar 12 with the front ends 23, 36 in one above the other relationship so as to bring the holes 24, 37 into vertical alignment. The rear ends 29, 40 will likewise be placed in one above the other relationship with the notches 33, 43 in vertical alignment. Next, the keeper element 46 is slipped forwardly over the fingers 31, 32, 41, 42 thus preventing vertical and transverse movement of the ends 29, 40 relative to one another. Next, the threaded end of the bolt 26 is passed downwardly through openings 24, 37 and the spacer 63 is moved upwardly onto the bolt 26. Next, the tine 11 is positioned so that its part 66 is in notches 33, 43 and the opening 62 of the tine 11 is aligned with the bolt 26. The tine 11 is then raised so that the threaded end of the bolt 26 extends through the hole 62. The nut 64 is then threaded onto the bolt 26 and tightened thereby drawing the clamping parts 21, 22 into firm engagement with the tool bar 12. Thus the single bolt 26 and its cooperating nut 64 serves as releasable fastening means for fastening the clamping parts 21, 22 to one another and to the tool bar 11 and as releasable fastening means for securing the tine to the clamping parts 21, 22. In operation the lower end of the S-shaped spring tooth tine 11 will move back and forth during working, this being permitted by the resilient flexibility of the tine. This flexing movement will change the configuration of the tine 11 but it will not cause the portion 66 to move out of the notches 33, 43 of the clamping parts 21, 22.

The present invention is particularly suited for releasably mounting a flexible earth-working tine on a transverse tool bar. The clamping arrangement takes up very little transverse space on the tool bar and is easily installed, removed and serviced. The clamping parts and keeper element are economically manufactured at low cost and the number of parts are held to a reasonable number. The interchangeability of the upper and lower clamping parts reduces tooling, manufacturing cost and parts storage requirements.

The embodiments of the invention in which an exclusive property or privilege is claimed are defined as follows:

1. Clamping arrangement for releasably connecting a flexible earth-working tine to a transverse tool bar of quadrangular cross section with a first pair of sloping side walls converging upwardly and a second pair of sloping side walls converging downwardly, said clamping arrangement comprising:
   a first clamping part having
      a first segment at its front end presenting a vertical opening,
      a second segment extending upwardly and rearwardly from said first segment in thrust transmitting engagement with one of said first pair of side walls,
      a third segment extending downwardly and rearwardly from said second segment in thrust transmitting engagement with the other of said first pair of side walls, and
      a rear segment having a pair of transversely spaced fingers defining a rearwardly opening notch;
   a second clamping part having
      a first portion at its front end presenting a vertical opening in alignment with said vertical opening in said first clamping member,
      a second portion extending downwardly and rearwardly from said first portion in thrust transmitting engagement with one of said second pair of said walls,
      a third portion extending upwardly and rearwardly from said second portion in thrust transmitting engagement with the other of said second pair of side walls, and
      a rear portion having a pair of transversely spaced fingers defining a rearwardly opening notch in vertically aligned relation with said notch on said rear segment of said first clamping part;
   a keeper element having a downwardly facing surface in thrust transmitting engagement with the top side of said rear segment of said first clamping part and an upwardly facing surface in thrust transmitting engagement with the bottom side of said rear portion of said second clamping part;
   a mounting end of said tine presenting a vertical opening in alignment with said vertical openings in said clamping parts;
   a curved sector on said tine extending from said mounting end rearwardly beneath said second clamping part thence upwardly through said notches and between said pairs of fingers thence forwardly in upwardly spaced relation over the top of said first clamping part thence downwardly in forwardly spaced relation in front of said clamping parts; and,
   releasable fastening means rigidly securing said mounting end of said tine to said clamping parts including a tension element extending through said openings.

2. The clamping arrangement of claim 1 wherein said curved sector of said tine maintains said keeper in assembly with said clamping parts.

3. The clamping arrangement of claim 1 and further comprising a spacer between said first portion of said second clamping part and said mounting end of said tine.

4. The clamping arrangement of claim 1 wherein said keeper element has a reduced width, vertically extending portion disposed in said notches defined by said pairs of fingers.

5. The clamping arrangement of claim 1 wherein said keeper element is disposed forwardly of the part of said curved sector of said tine which is disposed between said pairs of fingers.

6. The clamping arrangement of claim 5 wherein said part of said curved sector of said tine prevents said keeper element from moving rearwardly from said rear segment and said rear portion.

7. The clamping arrangement of claim 1 wherein said keeper element includes a vertical extending portion in said notches, a first pair of arms extending in opposite transverse directions from the upper end of said vertical extending portion in overlying relation to said rear segment of said first clamping part and a second pair of arms extending transversely in opposite directions from the lower end of said vertically extending portion in underlying relation to said rear portion of said second clamping part.

8. The clamping arrangement of claim 1 wherein said keeper element is I-shaped.

9. A clamping arrangement for releasably connecting an upper end of a flexible earth-working tine to a transverse tool bar comprising:

upper and lower clamping parts disposed above and below a portion of said tool bar and having corresponding front and rear ends;

a pair of transversely spaced and rearwardly extending fingers on said rear end of each of said clamping parts defining vertically aligned notches;

a curved sector on said upper end of said tine encircling said tool bar including an end portion disposed beneath said lower clamping part and an upwardly extending portion disposed in said notches;

a keeper element releasably fastening said rear ends of said clamping parts together, said keeper element being disposed forwardly of said upwardly extending portion whereby the latter maintains said keeper element in operative fastening relationship with said clamping parts; and releasable fastening means rigidly securing said front ends of said clamping parts and said end portion of said tine together whereby said clamping parts firmly engage said tool bar.

10. The clamping arrangement of claim 9 wherein said keeper element is I-shaped with its reduced width, intermediate portion disposed within said notches.

11. The clamping arrangement of claim 9 wherein said tool bar is a noncylindrical hollow member and said clamping parts are substantially identical.

12. The clamping arrangement of claim 9 and further comprising a spacer between the front end of said lower clamping part and said end portion of said tine.

13. A clamping arrangement for releasably connecting an upper end of a flexible earth-working tine to a transverse tool bar comprising:

upper and lower clamping parts disposed above and below a portion of said tool bar having front ends extending forwardly from said tool bar and rear ends extending rearwardly from said tool bar in one above the other relationship, a keeper element engaging said rear ends and limiting relative vertical and lateral movement of said ends, said keeper element and said rear ends being proportioned so as to permit installation of said keeper element on said rear ends by sliding said keeper forwardly over said rear ends, a curved sector on said upper end of said tine encircling said tool bar including an end portion disposed beneath said lower clamping part and an upwardly extending portion disposed behind said keeper so as to keep the latter on said rear ends of said clamping parts, releasable fastening means engaging said front ends of said clamping parts and drawing the latter into engagement with said tool bar, and releasable fastening means securing said end portion of said tine to at least one of said clamping parts.

14. The clamping arrangement of claim 13 and further comprising abutments on said rear ends of said clamping parts engaging transversely opposite sides of said upwardly extending portion of said tine to prevent transverse displacement of said tine relative to said rear ends.

* * * * *

UNITED STATES PATENT OFFICE
CERTIFICATE OF CORRECTION

Patent No. 4,047,823         Dated September 13, 1977

Inventor(s) John W. Mydels

It is certified that error appears in the above-identified patent and that said Letters Patent are hereby corrected as shown below:

Column 4, line 4, "said" should read ---side ---;

Column 4, line 19, "of" should read ---on---.

Signed and Sealed this

Ninth Day of May 1978

[SEAL]

Attest:

RUTH C. MASON
Attesting Officer

LUTRELLE F. PARKER
Acting Commissioner of Patents and Trademarks